US009093833B1

(12) United States Patent
Ellenbogen et al.

(10) Patent No.: US 9,093,833 B1
(45) Date of Patent: Jul. 28, 2015

(54) POWER FACTOR CORRECTION APPARATUS FOR APPLIANCES HAVING INDUCTIVE LOADS (75) Inventors: Richard Ellenbogen, Pelham Manor, NY (US); David Forsythe, Fenton, MO (US)

(73) Assignee: POWER FACTOR CORRECTION LLC, New Rochelle, NY (US)

( * ) Notice: Subject to any disclaimer, the term of this patent is extended or adjusted under 35 U.S.C. 154(b) by 1819 days.

(21) Appl. No.: 12/329,250

(22) Filed: Dec. 5, 2008

(51) Int. Cl.
*H01G 4/228* (2006.01)
*H02H 3/00* (2006.01)
*H02B 1/04* (2006.01)
*H05K 7/00* (2006.01)
*H02H 3/08* (2006.01)

(52) U.S. Cl.
CPC . *H02H 3/00* (2013.01); *H02H 3/08* (2013.01); *Y02B 40/00* (2013.01); *Y02B 70/12* (2013.01); *Y02B 70/126* (2013.01); *Y02B 70/16* (2013.01)

(58) Field of Classification Search
CPC ...... Y02B 70/126; Y02B 70/16; Y02B 70/12; Y02B 40/00; H02H 3/00; H02H 3/08
USPC .................. 323/205, 207, 208, 209; 363/146; 361/160, 271, 306.2, 643–644, 819
See application file for complete search history.

(56) References Cited

U.S. PATENT DOCUMENTS

| 2,025,471 | A | * | 12/1935 | Osborne | 323/208 |
| 3,539,830 | A | * | 11/1970 | Zollinger | 327/73 |
| 3,890,537 | A | * | 6/1975 | Park et al. | 315/208 |
| 4,105,964 | A | * | 8/1978 | Lebedev et al. | 323/258 |
| 4,135,101 | A | * | 1/1979 | Young et al. | 307/39 |
| 4,453,207 | A | * | 6/1984 | Paul | 363/139 |
| 4,645,997 | A | * | 2/1987 | Whited | 323/211 |
| 5,019,935 | A | * | 5/1991 | Nakamura | 361/45 |
| 5,075,815 | A | * | 12/1991 | Price | 361/274.1 |
| 5,367,246 | A | * | 11/1994 | Kaiser | 323/212 |
| 5,426,579 | A | * | 6/1995 | Paul et al. | 363/126 |
| 5,528,123 | A | * | 6/1996 | Hutchison | 323/205 |
| 5,550,411 | A | * | 8/1996 | Baker | 307/100 |
| 5,663,633 | A | * | 9/1997 | Kahn et al. | 323/218 |
| 5,742,103 | A | * | 4/1998 | Ashok | 307/105 |
| 5,760,499 | A | * | 6/1998 | Wu | 307/326 |
| 5,880,677 | A | * | 3/1999 | Lestician | 340/3.1 |
| 6,144,445 | A | * | 11/2000 | Nilssen | 315/209 R |
| 6,801,022 | B2 | * | 10/2004 | Fa | 323/208 |
| 7,002,321 | B2 | * | 2/2006 | McDaniel et al. | 323/211 |
| 7,254,005 | B2 | | 8/2007 | Oyama | |
| 2002/0101743 | A1 | * | 8/2002 | Kallus et al. | 363/34 |

(Continued)

OTHER PUBLICATIONS

William Rynone, Is Power Factor Correction Justified in the Home, Power Electronics Technology, May 2007, pp. 36-41.

(Continued)

*Primary Examiner* — Adolf Berhane
*Assistant Examiner* — Henry Lee, III
(74) *Attorney, Agent, or Firm* — Gordon & Jacobson, PC (57) ABSTRACT A power factor correction apparatus is retrofittable to an appliance having an inductive load. The apparatus includes a housing having an electrical socket on one side and an electrical plug on the other side. Inside the housing are a power factor correction circuit and a trigger circuit. The socket and plug are electrically coupled to each other by the trigger circuit which automatically couples the power factor correction circuit between the socket and the plug when current flowing to the appliance is sensed.

16 Claims, 7 Drawing Sheets (56) References Cited

U.S. PATENT DOCUMENTS

| | | | |
|---|---|---|---|
| 2003/0103303 A1* | 6/2003 | Barnes et al. | 361/58 |
| 2004/0035861 A1* | 2/2004 | Lee | 219/715 |
| 2004/0164718 A1* | 8/2004 | McDaniel et al. | 323/211 |
| 2007/0159740 A1* | 7/2007 | Williams et al. | 361/42 |
| 2008/0205104 A1* | 8/2008 | Lev et al. | 363/98 |

OTHER PUBLICATIONS

Whitby Hydro Energy Services Corp., Power Factor Correction at the Residential Level-Pilot Project, Sep. 12, 2005.

Richard Ellenbogen, Distributed Generation, Customer Premise Loads & the Utility Network A Case Study, Feb. 1, 2008.

* cited by examiner

POWER FACTOR CORRECTION APPARATUS FOR APPLIANCES HAVING INDUCTIVE LOADS

BACKGROUND OF THE INVENTION

1. Field of the Invention

This invention relates broadly to an electrical apparatus. More particularly, this invention relates to an electrical apparatus for use with appliances having inductive loads which corrects the power factor of the appliance circuit.

2. State of the Art

In a typical AC electric circuit, there is a time delay between when the voltage pushes an electrical current, and when that electrical current actually begins to flow. The duration of this time delay is one measure of the "Power Factor".

Currently, industrial countries generate most of their electricity in large centralized facilities, such as coal, nuclear, hydropower or gas powered plants. These plants have excellent economies of scale, but usually transmit electricity long distances. Most plants are built this way due to a number of economic, health & safety, logistical, environmental, geographical and geological factors. For example, coal power plants are built away from cities to prevent their heavy air pollution from affecting the populace, in addition such plants are often built near collieries to minimize the cost of transporting coal. Hydroelectric plants are by their nature limited to operating at sites with sufficient water flow.

Distributed generation is another approach. It reduces the amount of energy lost in transmitting electricity because the electricity is generated very near where it is used, perhaps even in the same building. This also reduces the size and number of power lines that must be constructed. Typically, distributed generation does not replace the utility network but rather supplements it. Excess energy produced by distributed generators is fed back into the network and the utility company purchases it from the customer who generated it. Unfortunately, high power factor distributed generation typical in modern "green" generating technologies, within customer premises reduces the power factor at the utility service entrance.

Power factor can also be expressed as the ratio of real power on the network to apparent power. The theoretical ideal power factor ratio is one. The two components of apparent power are real power and reactive power. Real power is the component for which the utility company bills its customers. Reactive power is an undesirable byproduct of having inductive loads (e.g. motors and transformers) connected by customers to an AC distribution system. Its characteristic is that the current waveform lags behind the voltage waveform. This results in higher operating currents and higher related thermal losses occurring throughout the system. Small appliances with motors, particularly air conditioners, generally have the worst power factor with respect to the size of the load they represent. In addition, air conditioners draw their power when the utility network is most heavily loaded. Also, as distributed generation proliferates, with less real power being delivered by the utility and reactive power remaining constant, the power factor of the utility network will decrease and the network may become unstable.

SUMMARY OF THE INVENTION

The present invention provides an apparatus which is easily retrofitted to an appliance by inserting it in series between an electrical outlet and the electrical plug of the appliance. The apparatus of the invention includes a housing having a plug on one side and a socket on the other side. The plug and socket are coupled to each other by a trigger circuit and selectively to an RC (resistor-capacitor) circuit. The trigger circuit automatically couples the RC circuit to the appliance circuit when the appliance is turned on and automatically decouples it when the appliance is turned off. The RC circuit corrects the power factor of the appliance circuit to near unity, reduces network load by 11-13% and reduces power consumption measured in watts by 5-8%. $I^2R$ losses on the utility transmission line associated with the appliance are reduced by approximately 20-25%. Initial tests of the device indicated a potential reduction of over 100 KVA of utility load in the 250 unit apartment complex where the device was tested at 67% less cost than power plant construction because of the near zero installation costs.

Additional objects and advantages of the invention will become apparent to those skilled in the art upon reference to the detailed description taken in conjunction with the provided figures.

DETAILED DESCRIPTION

Figure 1:
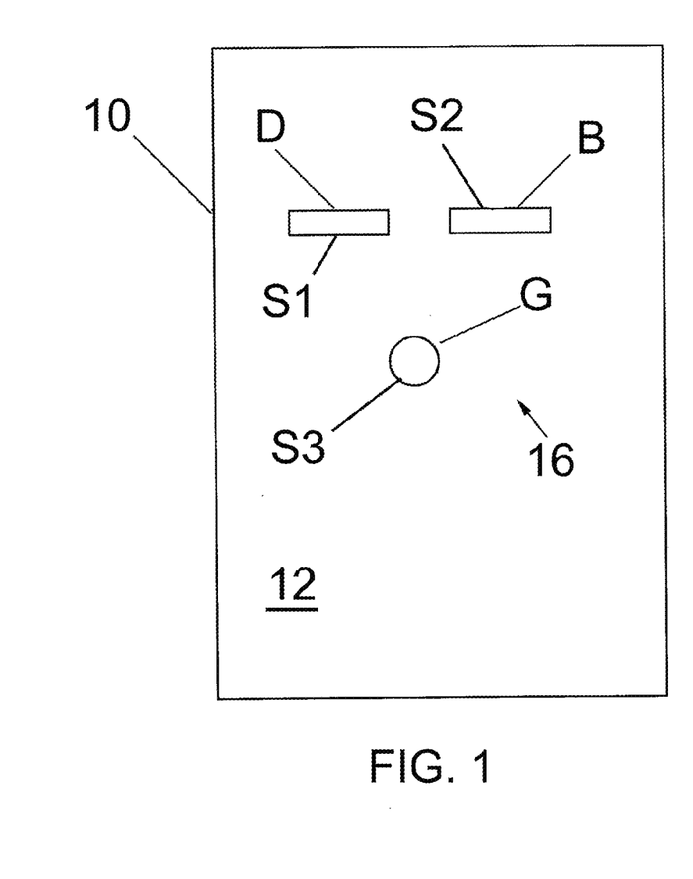
FIG. 1 is a side elevation view of the socket side of an apparatus according to the invention for use with a 220 VAC appliance.
Figure 2:
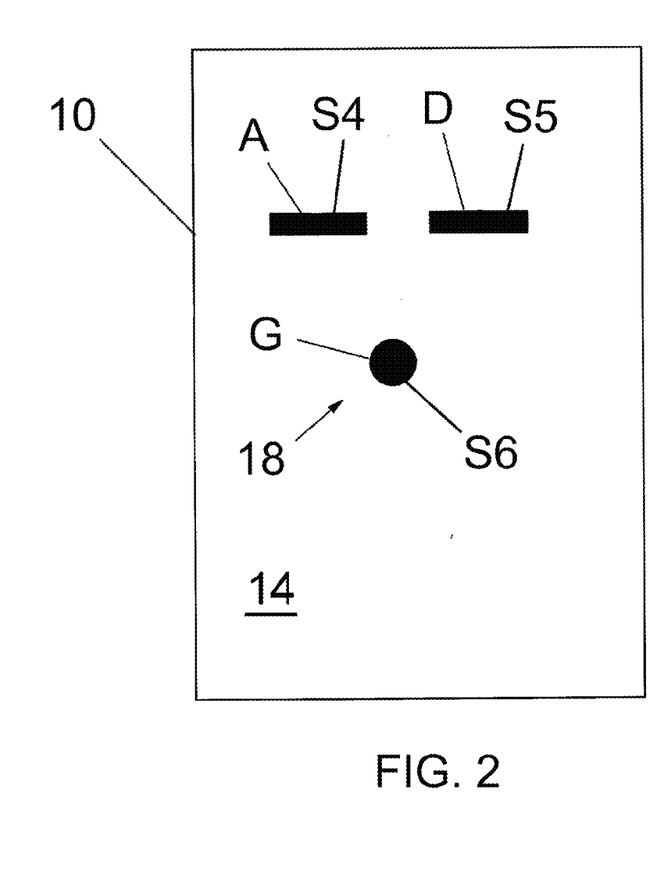
FIG. 2 is a side elevation view of the plug side of the apparatus of FIG. 1.

Turning now to FIGS. 1 and 2, an apparatus according to one embodiment of the invention includes a housing 10 having a front side 12 and a back side 14. An electrical outlet 16 is located on the front side 12 and an electrical plug 18 is located on the back side 14. As illustrated in FIGS. 1 and 2, the outlet and plug are US standard 220 VAC outlet and plug having two horizontal blades S1, S2 and a circular ground pin S3. The plug blades S1, S2 electrically labeled A and D and pin S3 electrically labeled G. The outlet has blade sockets S4, S5 electrically labeled B and D and pin socket S6 electrically labeled G. The sockets, blades and pins with the same electrical labels are directly coupled to each other, i.e. D is coupled to D and G is coupled to G. A is coupled to B via the primary winding of a transformer Ti as illustrated in FIG. 3.

Figure 3:
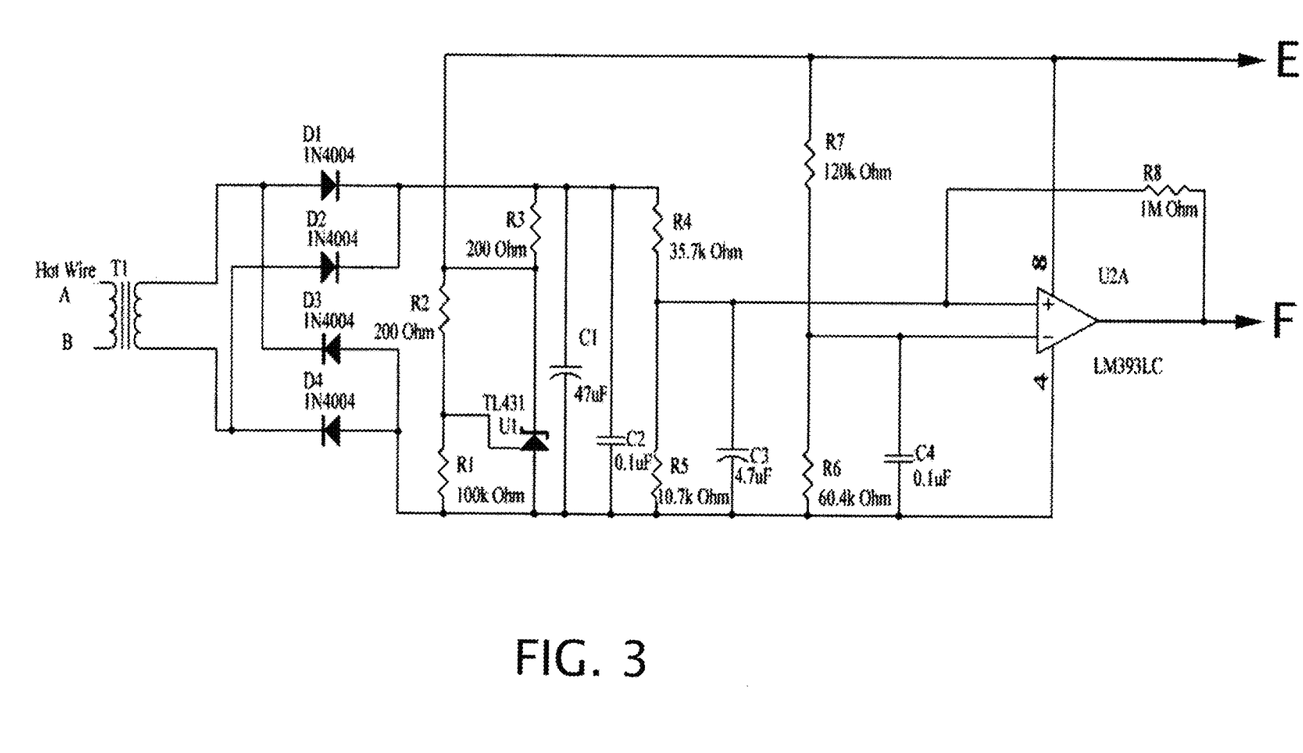
FIGS. 3 and 4 are a schematic diagram of the circuits of the invention with "E" and "F" showing the connections between the circuits in each figure.
Figure 4:
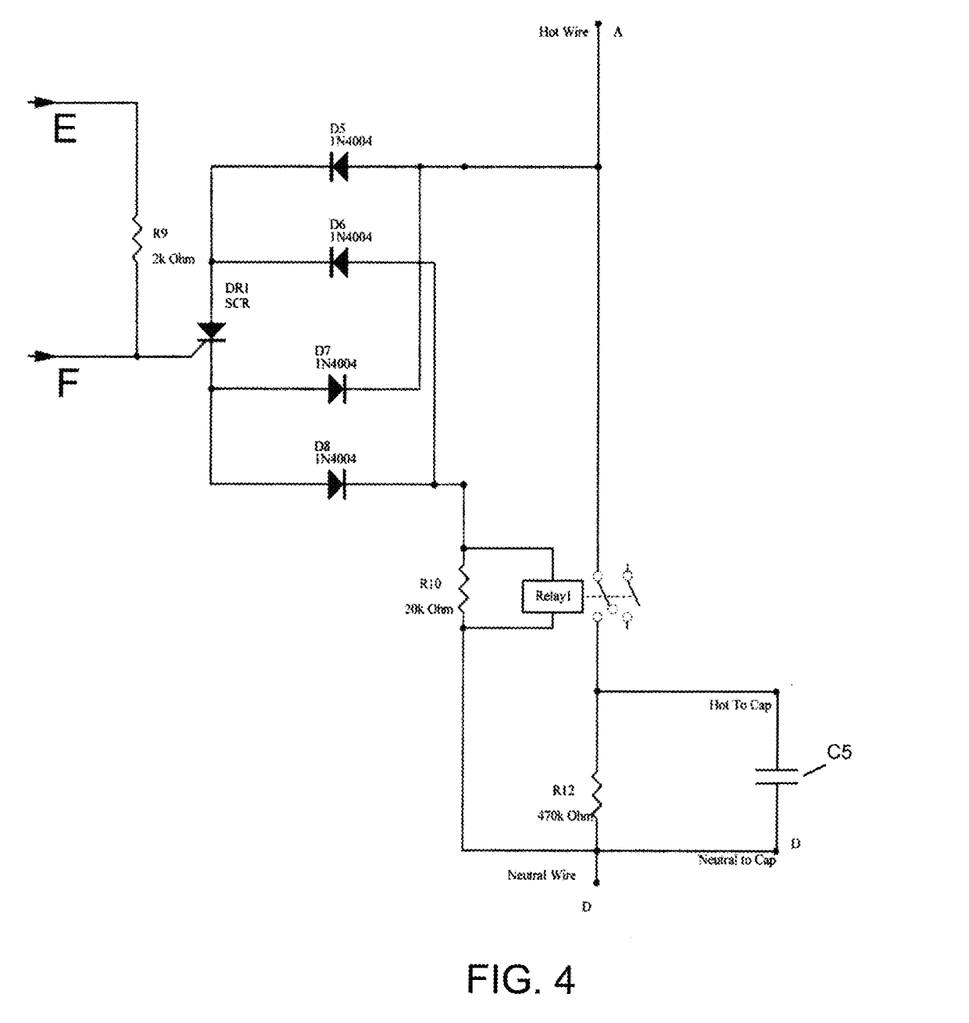

Referring now to FIGS. 3 and 4, The transformer T1 acts as a current transformer detecting current flowing between A and B. The voltage on the output of the transformer is then rectified by diodes D1-D4. The DC voltage is regulated by the circuit comprising resistors R1-R9, capacitors C1-C4 and adjustable shunt regulator U1. The regulated DC voltage is amplified by OPAMP U2A which provides a trigger input to SCR DR1. The SCR acts as a switch to apply a DC voltage to "Relay 1". The DC voltage is obtained from A and D via a second rectifier bridge composed of diodes D5-D8. R10 allows sufficient current to flow so that the SCR can turn on and off. When the relay is triggered, the parallel RC circuit composed of R12 and C5 is coupled between A and D. R12 allows the capacitor to discharge when the circuit is off.

The circuit illustrated in FIGS. 3 and 4 is designed for use with a 220 VAC air conditioner. The figures illustrate the values and part numbers of all of the components but for C5. The capacitor C5 is specified according to the size of the reactive load. 50 microfarads corresponds to 1 KVAR (kilovolt-amperes of reactive power) of correction at 220 volts. The value of the capacitor may be calculated using equation (1) below where C is capacitance in microfarads, f is the AC frequency (60 in the US), V is the RMS line voltage (220, 110, etc.) and KVAR is calculated according to equation (2) where W is watts and KVA (kilovolt amps) is watts divided by power factor.

$$C = \frac{(KVAR \times 1000)}{2 \times \pi \times f \times \left(\frac{V}{1000}\right)^2} \quad (1)$$

$$KVAR = \sqrt{KVA^2 - W^2} \quad (2)$$

In the presently preferred embodiment for use with 220 VAC air conditioners the value of C5 is 50 pF. From the foregoing, those skilled in the art will appreciate that the trigger circuit will close the relay upon sensing 4 amperes flowing across A-B. In the air conditioner application, the relay will not close unless the compressor is turned on and running, i.e. will not close when only the fan is running. Those skilled in the art will appreciate that the circuit can be modified so that the amount of current causing the trigger circuit to trigger is different for other appliances.

Figure 5:
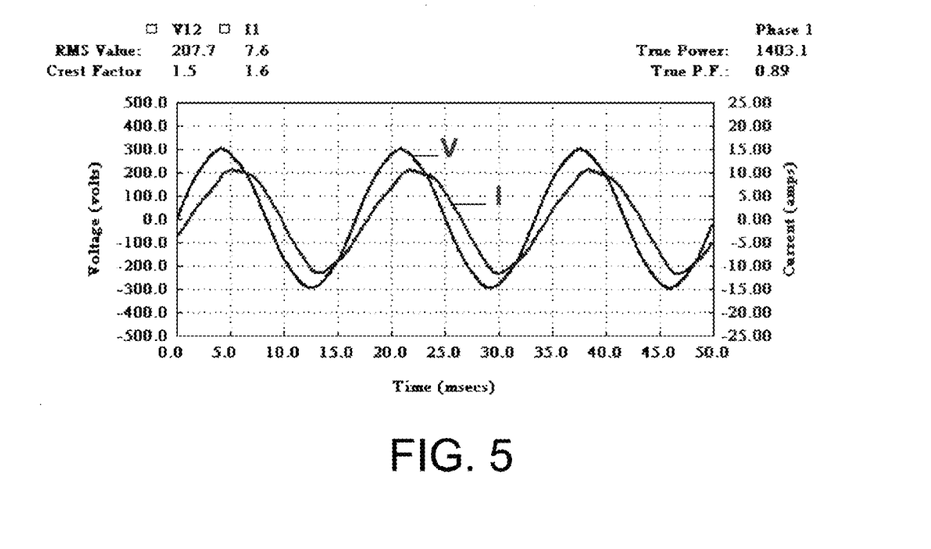
FIG. 5 is an illustration of the delay between the voltage and current wave forms in an air conditioner circuit without the benefit of the invention.

The apparatus of the invention was tested on a one ton FEDDERS® (FEDDERS® is a registered trademark for "air conditioning and cooling apparatus, namely, heating units for home and industrial purposes, cooling units for home and industrial purposes, air filters for domestic use, humidifiers, and dehumidifiers; refrigerator condensers; heat pumps; portable heaters; structural parts for all of the foregoing" in trademark International Class 009) window air conditioner turned to "high cool" on a 90° F. day. The oscilloscope graph of FIG. 5 shows the voltage V and current I wave forms of one phase in the air conditioner circuit without the benefit of the present invention. It can be seen that the current lags behind the voltage. Calculations revealed that the power factor of the air conditioner circuit was 0.89 with a power consumption of 1,403 watts.

Figure 6:
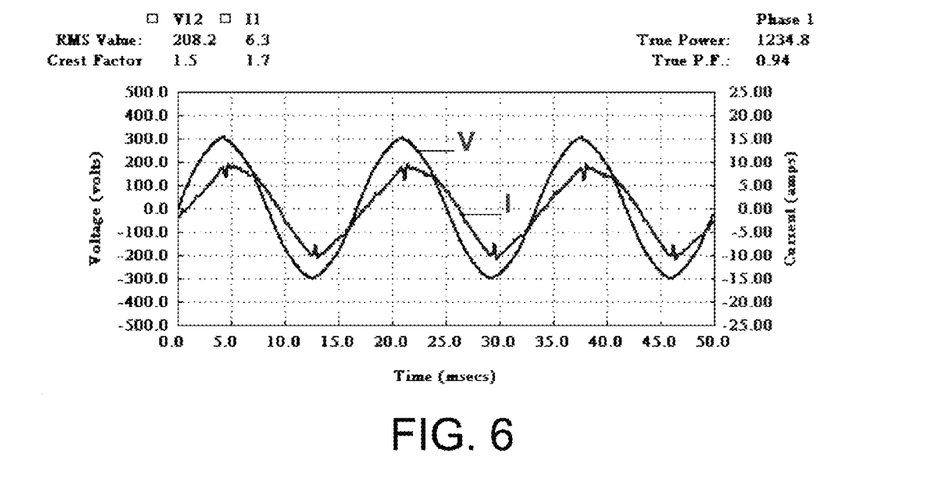
FIG. 6 is an illustration of the delay between the voltage and current wave forms in an air conditioner circuit with the benefit of the invention.

FIG. 6 illustrates the voltage V and current I wave forms of one phase in the air conditioner circuit with the benefit of the present invention. It can be seen that the voltage and current peaks are nearly perfectly aligned. Calculations revealed that the power factor was increased to 0.94, a 5.6% increase. Power consumption was reduced to 1,235 watts, a savings of 11.9%. The test was performed with a 40 uF Capacitor resulting in a power factor of 0.94. A 50 uF capacitor in a later test increased the power factor to 0.99.

Figure 7:
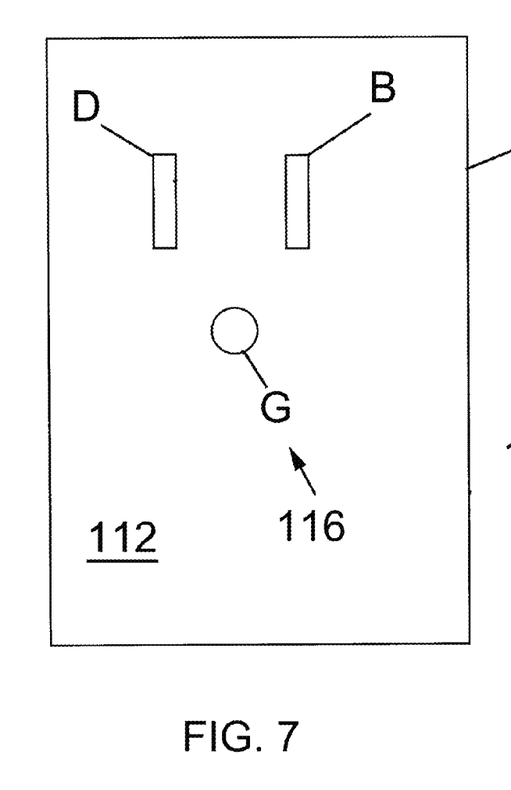
FIG. 7 is a side elevation view of the socket side of an apparatus according to the invention for use with a 110 VAC (15 amp) appliance.
Figure 8:
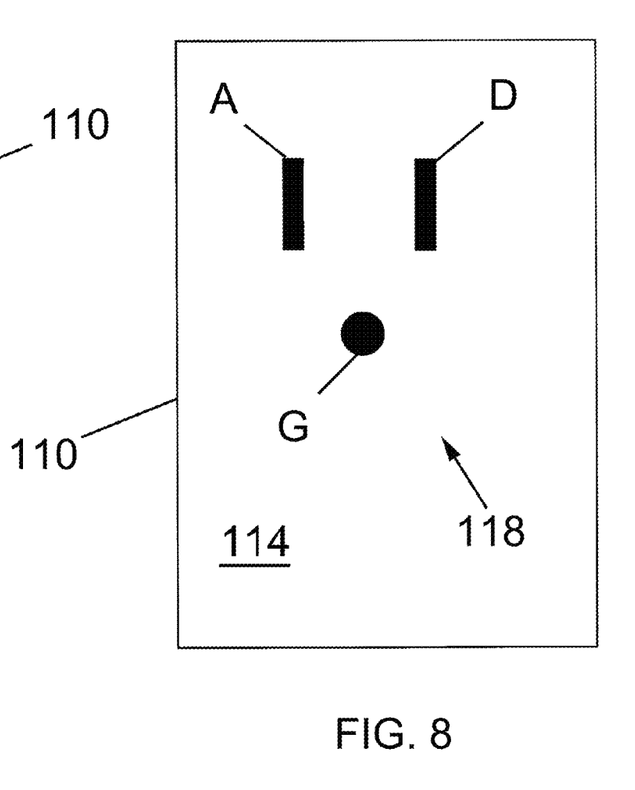
FIG. 8 is a side elevation view of the plug side of the apparatus of FIG. 7.

From the foregoing, those skilled in the art will appreciate that the apparatus according to the invention can be applied to any appliance that presents an inductive load to the network, e.g. any appliance that has a motor or a transformer. It will also be appreciated that the apparatus can be adapted to be used with different plug and outlet arrangements as well as different power sources. FIGS. 7 and 8 are similar to FIGS. 1 and 2 with similar reference numerals (increased by 100) referring to similar parts and the alphabetical references referring to the same parts of the circuit, i.e. front side 112, back side 114, electrical outlet 116, and electrical plug 118. These figures show the standard US plug/outlet configuration for a grounded 110/120 VAC (15 amp) power source as compared to the standard US 220 VAC configuration shown in FIGS. 1 and 2. All circuitry is identical between voltages and the amount of reactive correction available except for the relay, the capacitor C5, and the pin configurations on the plug and receptacle. Similarities between all versions greatly reduces the production costs of the device, allowing for less expensive implementation and greater public acceptance.

Figure 9:
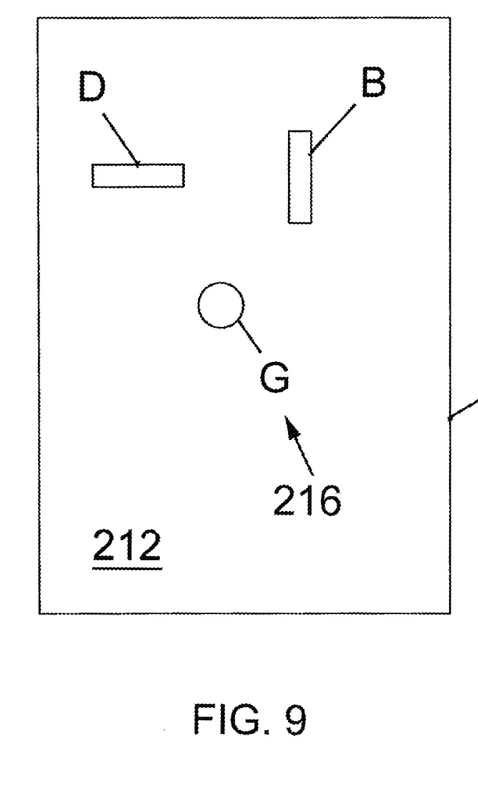
FIG. 9 is a side elevation view of the socket side of an apparatus according to the invention for use with a 110 VAC (20 amp) appliance.
Figure 10:
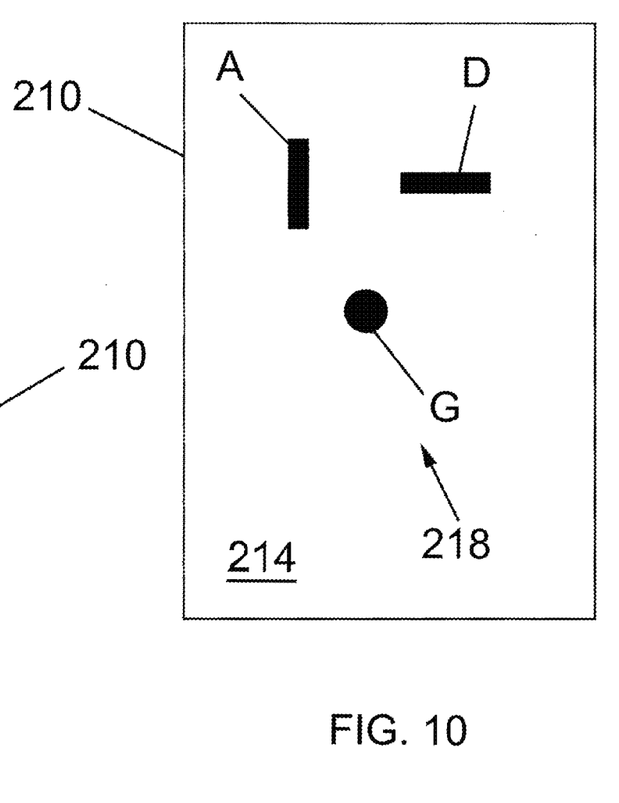
FIG. 10 is a side elevation view of the plug side of the apparatus of FIG. 9.

FIGS. 9 and 10 are similar to FIGS. 1 and 2 with similar reference numerals (increased by 200) referring to similar parts and the alphabetical references referring to the same parts of the circuit, i.e. front side 212, back side 214, electrical outlet 216, and electrical plug 218. These figures show the standard US plug/outlet configuration for a grounded 110/120 VAC power source of 20 amperes where the blades are arranged perpendicular to each other.

Figure 11:
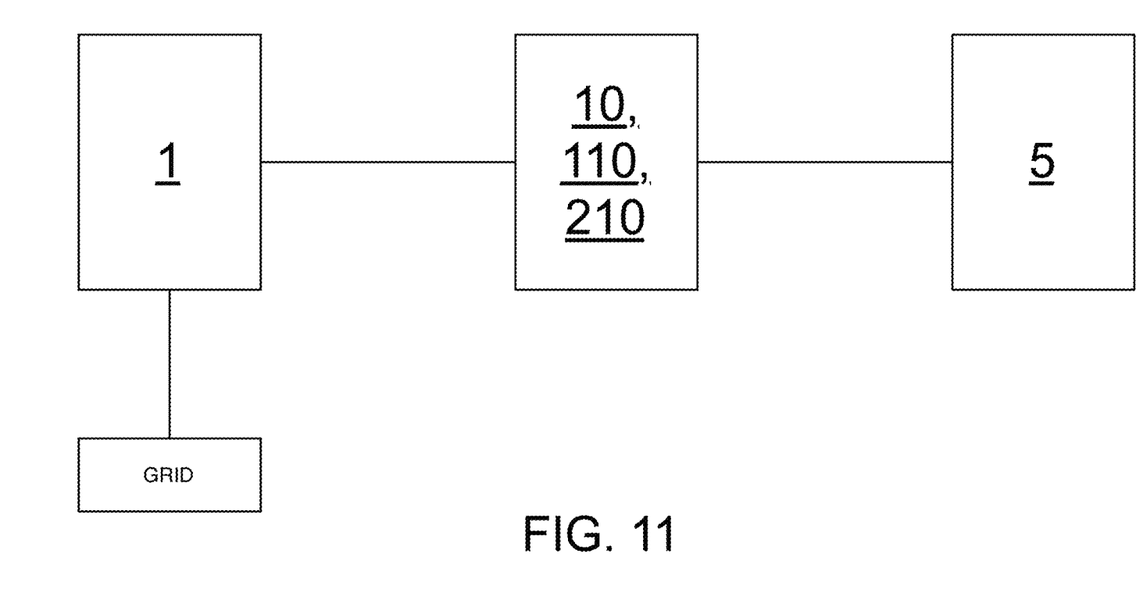
FIG. 11 is a simplified block diagram showing the invention coupled to an appliance and an AC source which is coupled to the electrical grid.

FIG. 11 shows housing 10, 110, 210 containing the apparatus of FIGS. 3 and 4 as it is placed between an AC source 1 and an appliance 5. This figure also shows the AC source coupled to the electrical GRID.

There have been described and illustrated herein several embodiments of a power factor correction apparatus for appliances having inductive loads. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. An apparatus for correcting power factor of an appliance having an inductive load to be coupled to an AC line source, said apparatus comprising:
    a housing, said housing having a load side and a line side;
    an electrical outlet located on said load side to be coupled to the appliance having the inductive load;
    an electrical plug located on said line side to be coupled to the AC line source; and
    a power factor correction circuit contained within said housing and being electrically coupled to said electrical plug and said electrical outlet when the AC line source is coupled to the electrical plug,
    the appliance having the inductive load coupled to the electrical outlet when the appliance having the inductive load is turned on and drawing a predetermined current,
    when the appliance having the inductive load is turned on, said power factor correction circuit turns on and corrects for excess reactive load in the appliance having the inductive load by reducing current on a line side of the power factor correction circuit, said power factor correction circuit being automatically uncoupled from said electrical plug when the appliance having an inductive load is turned off, said power factor correction circuit including a trigger circuit having a capacitor, said trigger circuit decouples the capacitor from the electrical plug if the apparatus is unplugged preventing a hazardous condition.

2. An apparatus according to claim 1, wherein:
said power factor correction circuit includes an RC (resistor-capacitor) circuit.

3. An apparatus according to claim 2, wherein:
said RC circuit is a parallel RC circuit.

4. An apparatus according to claim 2, wherein:
said trigger circuit couples said RC circuit between the appliance having an inductive load and the AC line source when the appliance is turned on and drawing said predetermined current.

5. An apparatus according to claim 4, wherein:
said trigger circuit includes a transformer, a voltage regulator coupled to said transformer, an amplifier coupled to said voltage regulator, and a relay coupled to said amplifier.

6. An apparatus according to claim 4, wherein:
said trigger circuit includes a current sensor coupled to a relay, said current sensor activating said relay when a predetermined number of amperes flowing to the appliance having an inductive load is sensed by said current sensor.

7. An apparatus according to claim 6, wherein:
said predetermined number of amperes is at least 4 amperes.

8. An apparatus according to claim 5, wherein:
said trigger circuit further includes a first rectifier bridge coupled between said transformer and said voltage regulator.

9. An apparatus according to claim 8, wherein:
said trigger circuit further includes a second rectifier bridge coupled between said amplifier and said relay.

10. An apparatus according to claim 2, wherein:
said RC circuit includes a 50 µF capacitor.

11. An apparatus according to claim 1, wherein:
said appliance having an inductive load and said power factor correction circuit operate at a line frequency of approximately 60 Hz and not substantially higher.

12. An apparatus according to claim 2, wherein:
said power factor correction circuit is completely analog.

13. An apparatus according to claim 5, wherein:
said power factor correction circuit does not regulate load voltage.

14. An apparatus according to claim 9, wherein:
said power factor correction circuit does not rectify load voltage.

15. An apparatus for correcting power factor of an appliance having an inductive load to be coupled to an AC source, said apparatus comprising:

a housing;

an electrical outlet located on a load side of said housing to be coupled to the appliance having an inductive load;

an electrical plug located on a line side of said housing to be coupled to the AC source;

a power factor correction circuit contained within said housing, coupled to said line side and said load side, and being adapted to correct the power factor of the appliance having the inductive load by reducing current on a line side of the power factor correction circuit, said power factor correction circuit including a trigger circuit having a capacitor, said trigger circuit decouples the capacitor from the electrical plug if the apparatus is unplugged preventing a hazardous condition.

16. The apparatus according to claim 15, wherein:
the AC source is coupled to an electrical grid and apparatus helps protect the electrical grid from overload by reducing KVA and KW.

\* \* \* \* \*